No. 704,170. Patented July 8, 1902.
P. P. BATTE.
SAWING MACHINE.
(Application filed Mar. 4, 1902.)
(No Model.) 2 Sheets—Sheet 2.
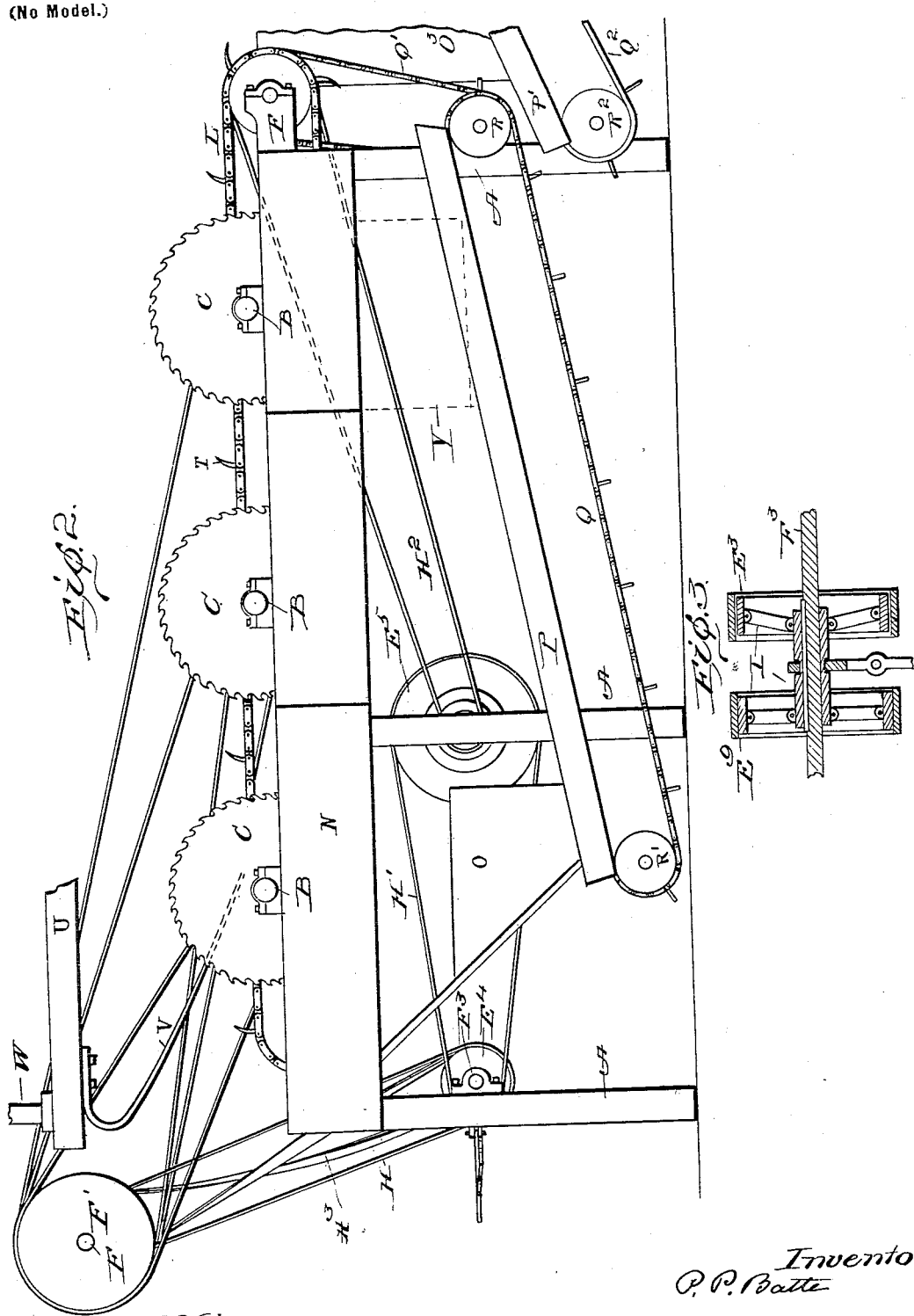
Witnesses:
J. M. Fowler Jr.
Edgar B. McBath.
Inventor
P. P. Batte
by
Wallace Brune
Atty.

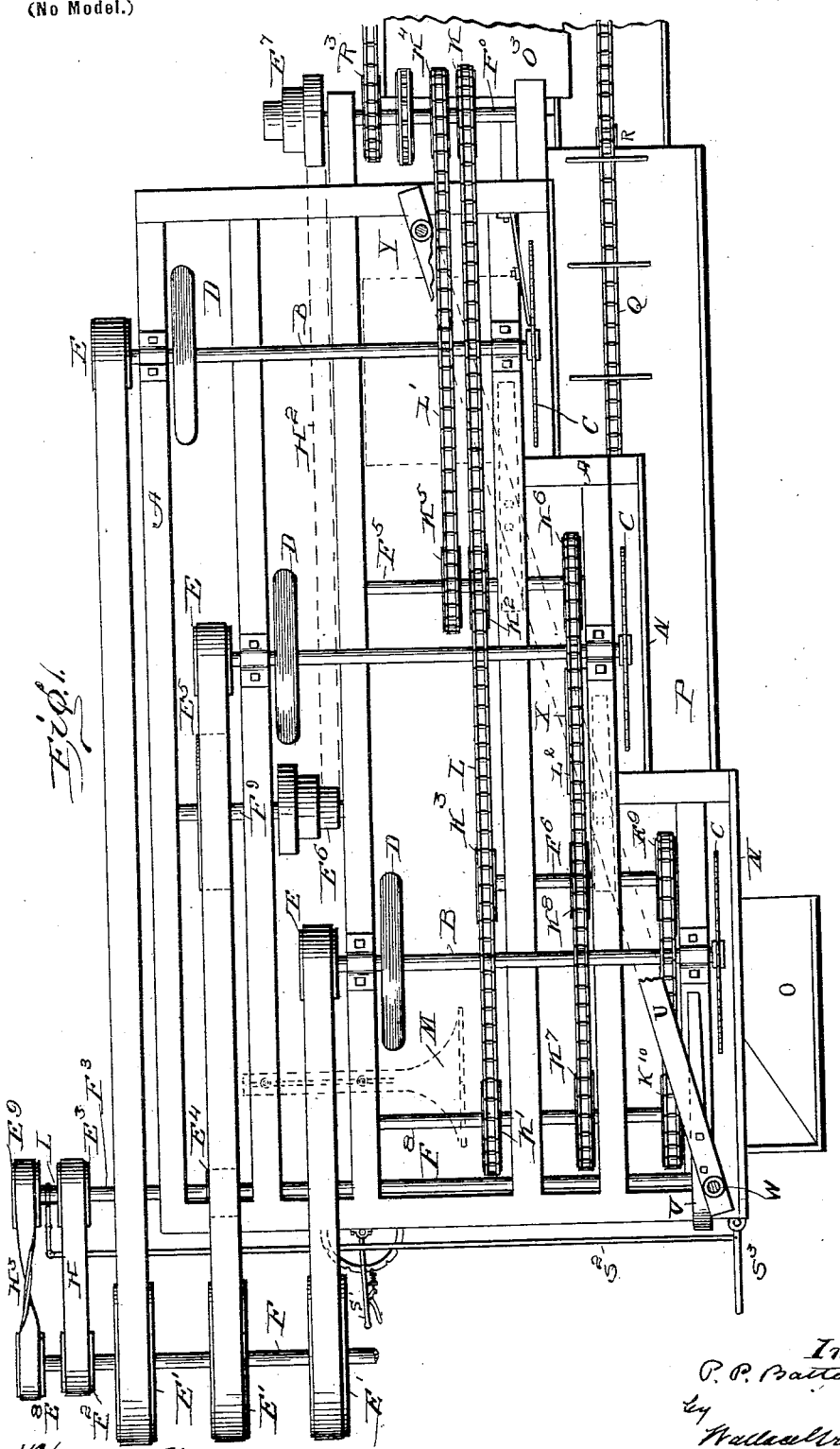

UNITED STATES PATENT OFFICE.

PETER P. BATTE, OF PETERSBURG, VIRGINIA.

SAWING-MACHINE.

SPECIFICATION forming part of Letters Patent No. 704,170, dated July 8, 1902.

Application filed March 4, 1902. Serial No. 96,657. (No model.)

*To all whom it may concern:*

Be it known that I, PETER P. BATTE, a citizen of the United States, residing at Petersburg, in the county of Dinwiddie and State of Virginia, have invented certain new and useful Improvements in Sawing-Machines; and I do hereby declare the following to be a full, clear, and exact description of the invention, such as will enable others skilled in the art to which it appertains to make and use the same.

My invention is intended to provide a machine that shall be more satisfactory in capacity, compactness, simplicity, cost, and safety than machines now in use for sawing wood—such as "cord-wood," for example—into short lengths; and it relates to that class of machines in which preferably two attendants supply in succession the sticks to be cut and the machine automatically divides each into the desired number of parts and delivers those parts at a distant point. For practical efficiency the saws of such a machine must run at a very high speed, and in their use accidents often occur. My experience indicates that such accidents are almost invariably caused by inability to instantly stop the feed or to reverse it, withdrawing the wood from all the saws, or by displacement of some already-severed block. Among the objects of my invention is the elimination of these evils. In my machine the wood to be sawed is laid transversely upon a series of traveling chain belts and is carried forward by them to a series of saws acting in succession to cut successive portions from the end of each advancing stick. Each piece as it is cut off falls below the cutting plane and is carried forward by an independent carrier and delivered, with the residual end of the stick, at one side of the machine to a more or less inclined carrier, by which it is transported to any desired point. Each saw is driven independently of the others from a power-shaft common to all. The carrying-chains are driven independently of the saws, and devices are provided whereby an attendant at either side of the machine may instantly start, stop, or reverse the movement of the chains.

In the accompanying drawings, Figure 1 is a plan view of the apparatus. Fig. 2 is a side elevation of the same. Fig. 3 is a view showing a certain clutch through which power is transmitted to a chain-driving shaft.

In the views, A designates a suitable frame, upon which are mounted any desired number of saw-arbors B, carrying saws C, each shown as at the end of its arbor, although where it is desired to use the common expedient of making the saws adjustable to cut the wood into longer or shorter segments they may obviously be differently arranged. Each arbor bears a suitable fly-wheel D and a belt-pulley E, driven by its own belt from a pulley E' upon a power-shaft F, shown as above the machine and in front of the same. At the opposite end of the machine is a sprocket-wheel shaft $F^0$, normally driven from the power-shaft F by a pulley $E^2$, belt H, pulley $E^3$, clutch I, a shaft $F^9$, pulley $E^4$, belt H', pulley $E^5$, shaft $F^3$, cone-pulley $E^6$, belt $H^2$, and cone-pulley $E^7$, but driven in a contrary direction by shaft F, pulley $E^8$, crossed belt $H^3$, pulley $E^9$, clutch I, shaft $F^3$, &c., whenever the clutch is caused by devices to be described to release the pulley $E^3$ and engage the pulley $E^9$. Upon the shaft $F^0$ is a sprocket-wheel K, carrying a sprocket-chain L, which passes around a corresponding sprocket-wheel K' upon a shaft $F^8$ at the front of the machine and also engages and is supported by sprocket-wheels $K^2$ $K^3$ upon shafts $F^5$ $F^6$ a little in the rear of the first two saw-arbors, respectively. The shaft $F^5$ is also driven from the shaft $F^0$ through sprocket-wheels $K^4$ $K^5$ and a chain belt L', and it carries a sprocket-wheel $K^6$ and a chain belt $L^2$, which passes around a sprocket-wheel $K^7$ upon the shaft $F^8$ and engages a sprocket-wheel $K^8$ upon the shaft $F^6$, coöperating with the sprocket-wheel $K^3$ in driving it. This shaft $F^6$ also bears a sprocket-wheel $K^9$, from which a chain belt passes to a sprocket-wheel $K^{10}$ upon the shaft $F^8$. All these sprocket-wheels are in substantially the same horizontal plane, and the height of that plane is such that the upper rearwardly-moving folds of the belts pass slightly above the several saw-arbors.

Upon the frame, near the front of the machine, is an adjustable stop M, against which the attendants place the end of each stick as it is laid upon the chains. As the chains carry rearward the stick thus placed a block or segment is cut from its end by the first saw and falls from its own weight, a guard-plate N making it impossible for it to reach the lower portion of the saw. As it falls it strikes upon a normally inclined chute O and passes thence into a trough P, in which runs rearwardly the upper fold of a carrier-belt Q, carried by sprocket-wheels R R', driven from the shaft $F^0$ by a sprocket-chain Q'. At the rear side of the machine the belt Q delivers it into a lower upwardly-inclined trough P', in which runs an analogous carrier-belt $Q^2$, passing around a sprocket-wheel $R^2$ and driven at its distant end (not shown) from any suitable source of power—for example, by a sprocket-wheel $R^3$ upon the shaft $F^0$. As the stick continues to move rearward after the severing of the end segment, as already described, a second segment is cut off in like manner by the next saw and falls into the trough P. In a like manner the succeeding saw cuts off another segment, which falls into the same trough. The last segment being beyond all the saws and not in position to cause any accident is carried on beyond the end of the frame and dropped upon an inclined board $O^3$, which delivers in the trough P' with all the parts of the stick which had been severed from it. The speed of the wood-carrying chains should be varied with the character of the wood and the condition of the saws, and this variation may be made by means of the cone-pulleys.

In order that the wood-carrying chains may at will be stopped or have their direction of movement reversed, I provide two pulleys $E^2$ $E^8$ upon the driving-shaft and two corresponding constantly-driven loose pulleys $E^3$ $E^9$ upon the shaft $F^3$, the loose pulleys being made to rotate in opposite directions by crossing one of the belts. Upon the shaft $F^3$ and between these loose pulleys is a double friction-clutch I, which by means of a hand-lever S' is caused to engage either or neither of the loose pulleys. This lever swings over a segment or quadrant provided with recesses to be engaged by a spring-pawl adapted to be disengaged by mere forcible swinging of the lever and so arranged that when the first recess is engaged the forwardly-driving loose pulley rotates the shaft $F^3$. When the second is engaged, both loose pulleys rotate on the shaft, and when the third is engaged the shaft is rotated in a reversed direction by the engagement of the clutch with the loose pulley operated by the crossed belt. In order that this clutch may be operated from the opposite side of the machine, as well as from its own side, the lever S' is connected by a rod $S^2$ to a lever $S^3$, pivoted at the opposite side of the machine. Obviously these levers must move together, and the clutch is therefore operated by either. If then either attendant observes anything calling for such action, he may instantly arrest the forward movement of all the wood-feeding chains or may reverse their movement, carrying all the advancing wood rearwardly from the saws, the fact that severed pieces have been dropped below the saws being here of especial importance.

The wood-carrying chains are provided with suitable arms T to engage and move rearward the wood to be cut, and near each saw is a spring or spring-pressed inclined bar V for holding each advancing stick firmly down upon the chains while it is being cut and at the same time resisting its advance, and thus keeping it pressed with some force against the arm which carries it. Each spring is secured to any suitable support, shown as a bar U, extending diagonally over the frame and supported either from the latter or by bars W, which depend from convenient fixed portions of the building in which the machine may be placed. The front portions of these springs are placed far enough above the chains to permit any stick which the saws can completely sever to pass freely beneath, and their rear ends extend down nearly to the chains, so that they may press the smallest stick. Preferably each is so formed that although it always exerts a strong pressure on a small stick its rear end rises to allow the largest stick to pass without dangerous strain upon any portion of the spring. Rigid supports X may be placed beneath the chains to support the portions pressed downward by the springs.

The residual end segment of each stick instead of being carried onto the end of the frame after leaving the last saw may be allowed to drop through the upper portion of the frame and be guided into the trough P' by a deflecting-board Y. (Shown in dotted lines.)

It is to be observed that in many points the construction shown need not be exactly followed. For example, the width and number of chains will vary with the character of the work, the various pulleys may be differently located, the friction-clutch may be of different form, and the carriers may be of any approved construction. I do not, therefore, wish to limit myself to specific construction, but desire to claim my invention as broadly as the state of the art will permit.

What I claim is—

1. The combination with devices adapted to convey sticks laterally of a series of parallel saws in position to act in succession cutting successive segments from the end of a stick conveyed by said devices, a table for supporting the saws, and means for driving the devices and saws; said conveying devices, table and driving means being arranged to permit each of the successive segments as it is cut from the stick to drop instantly below the saw which severed it.

2. The combination of a series of saws arranged to cut segments in succession from the end of a stick fed sidewise to them and mounted in a frame permitting each segment as it is severed to fall below the plane of the saw severing it, and means for so feeding sticks in succession to the saws.

3. The combination with a suitable open frame, of means for carrying a series of sticks transversely across the frame, saws arranged in succession in the path of said sticks to cut from each successive segments, and a carrier arranged below the plane of the saws in position to receive the segments or blocks as they fall in succession from the saws.

4. The combination with a series of saws arranged in position to cut segments or blocks in succession from the end of a stick, fed sidewise to the saws, carrying devices arranged to thus feed the sticks to the saws, and means for at will reversing the movement of said devices.

5. A series of saws arranged out of line and one in advance of another and mounted in a frame adapted to permit blocks at one side of any saw to fall below the latter, carriers arranged to feed long wood sidewise to the saws without obstructing such fall of blocks, and means for pressing the sticks firmly against said carriers while any saw acts upon it.

6. The combination with a series of saws arranged in position to cut blocks in succession from one end of sticks advancing sidewise to the saws and mounted in a frame adapted to permit each block to fall when severed, carriers driven independently of the saws and arranged for thus advancing a succession of sticks to the saws, and means operable from either side of the frame to reverse the movement of the carriers.

7. The combination with a table of devices arranged to convey sticks sidewise along the same, of parallel saws arranged at successively greater distances from that side from which the sticks are conveyed and in the path of such sticks; said table being narrowed by successive offsets, whereby each saw lies near the table's margin, to the end that each of the successive segments cut from the end of any stick by the several saws may drop instantly below the saw which severed it.

In testimony whereof I affix my signature in presence of two witnesses.

PETER P. BATTE.

Witnesses:
SCHUYLER DURYEE,
EDWIN S. CLARKSON.